US006650842B1

United States Patent
Fee et al.

(10) Patent No.: US 6,650,842 B1
(45) Date of Patent: Nov. 18, 2003

(54) OPTICAL LINK WITH REDUCED FOUR-WAVE MIXING

(75) Inventors: John A. Fee, Richardson, TX (US); Frank A. McKiel, Jr., Plano, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/215,844

(22) Filed: Dec. 18, 1998

(51) Int. Cl.⁷ .................................................. H04B 10/00
(52) U.S. Cl. ...................... 398/147; 398/141; 398/148; 398/79; 398/81; 398/178
(58) Field of Search ................................. 398/141, 147, 398/148, 178, 79, 81

(56) References Cited

U.S. PATENT DOCUMENTS

| | | | | |
|---|---|---|---|---|
| 5,546,210 A | * | 8/1996 | Chraplyvy et al. | 359/124 |
| 5,559,920 A | * | 9/1996 | Chraplyvy et al. | 385/123 |
| 5,606,445 A | * | 2/1997 | Kikuchi et al. | 359/161 |
| 5,629,795 A | * | 5/1997 | Suzuki et al. | 359/337 |
| 5,673,354 A | * | 9/1997 | Akasaka et al. | 385/127 |
| 5,677,786 A | * | 10/1997 | Meli | 359/341 |
| 5,909,297 A | * | 6/1999 | Ishikawa et al. | 359/161 |
| 5,946,117 A | * | 8/1999 | Meli et al. | 359/124 |
| 5,956,440 A | * | 9/1999 | Mikami et al. | 385/24 |
| 5,978,122 A | * | 11/1999 | Kawazawa et al. | 359/179 |
| 6,011,892 A | * | 1/2000 | Chraplyvy et al. | 385/123 |
| 6,021,245 A | * | 2/2000 | Berger et al. | 385/123 |
| 6,043,914 A | * | 3/2000 | Cook et al. | 359/124 |
| 6,055,081 A | * | 4/2000 | Koyano et al. | 359/161 |
| 6,175,435 B1 | * | 1/2001 | Watanabe | 359/161 |
| 6,243,176 B1 | * | 6/2001 | Ishikawa et al. | 359/124 |
| 6,317,238 B1 | * | 11/2001 | Bergano et al. | 359/161 |
| 6,335,995 B1 | * | 1/2002 | Kato et al. | 385/123 |

* cited by examiner

*Primary Examiner*—Leslie Pascal
*Assistant Examiner*—Hanh Phan

(57) ABSTRACT

An optical communication system and method of use thereof which uses dispersion compensators to intentionally create a dispersive condition at the output of subsequent inline optical amplifiers. The present invention reduces four-wave mixing and increases the allowable spacing between optical amplifiers, thus reducing the required number of amplifiers and dispersion compensators for a given length of optical fiber. In one embodiment, dispersion compensators and optical amplifiers are alternately spaced from one another along a length of an optical fiber such that the dispersion compensators render a dispersive condition at the amplifiers allowing each amplifier to be run at a higher power level. In another embodiment, the dispersion compensator is collocated with the amplifier, but is positioned between a pre-amp stage and a high power output stage to overcompensate both the slope and absolute dispersion of the fiber up to that point. The dispersion compensator provides a dispersive condition at the output of the output stage allowing the amplifier to be operated at a higher power level without creating four-wave mixing. In yet another embodiment of the invention, an additional dispersion compensator is provided at the output of a transmitter to overcompensate both the slope and absolute dispersion of the fiber to render a substantially neutral dispersion signal upon arrival at the next optical line element or receiver.

17 Claims, 5 Drawing Sheets

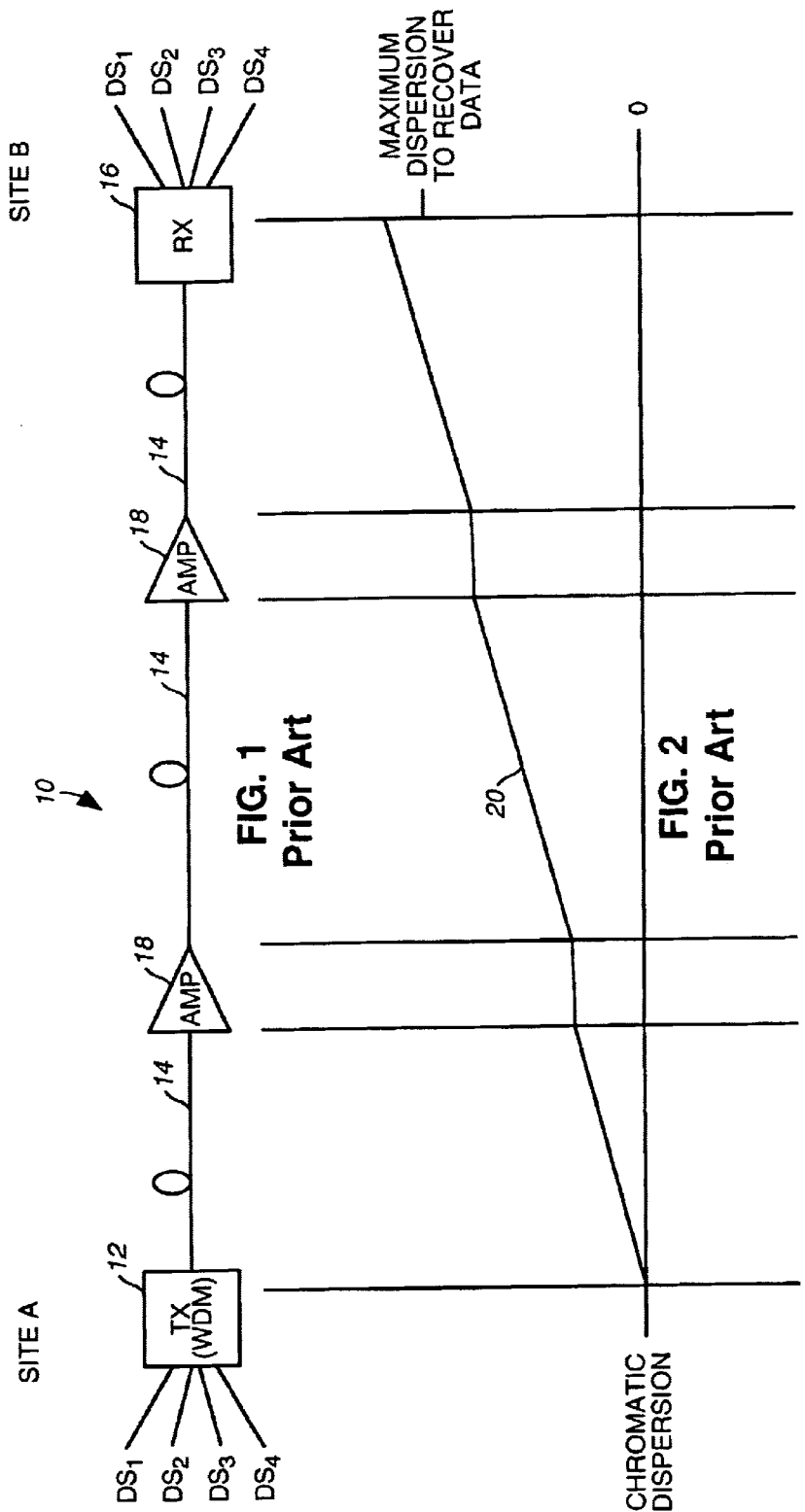
FIG. 1
Prior Art
FIG. 2
Prior Art
FIG. 3
Prior Art
OPTICAL LINK WITHOUT DISPERSION COMPENSATION

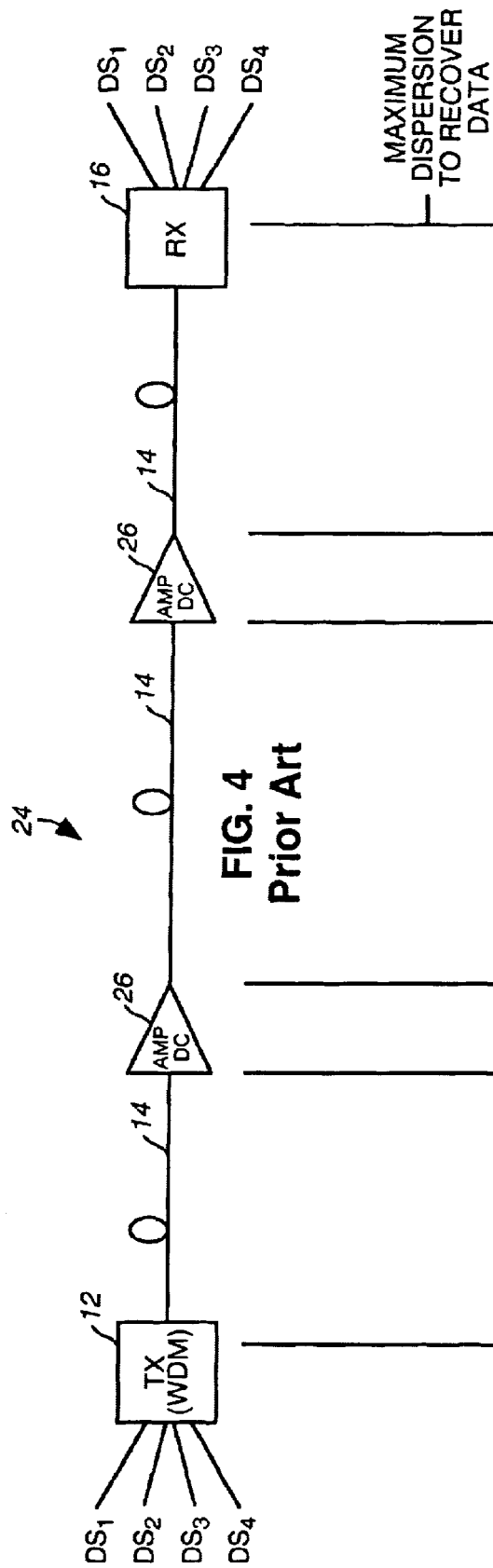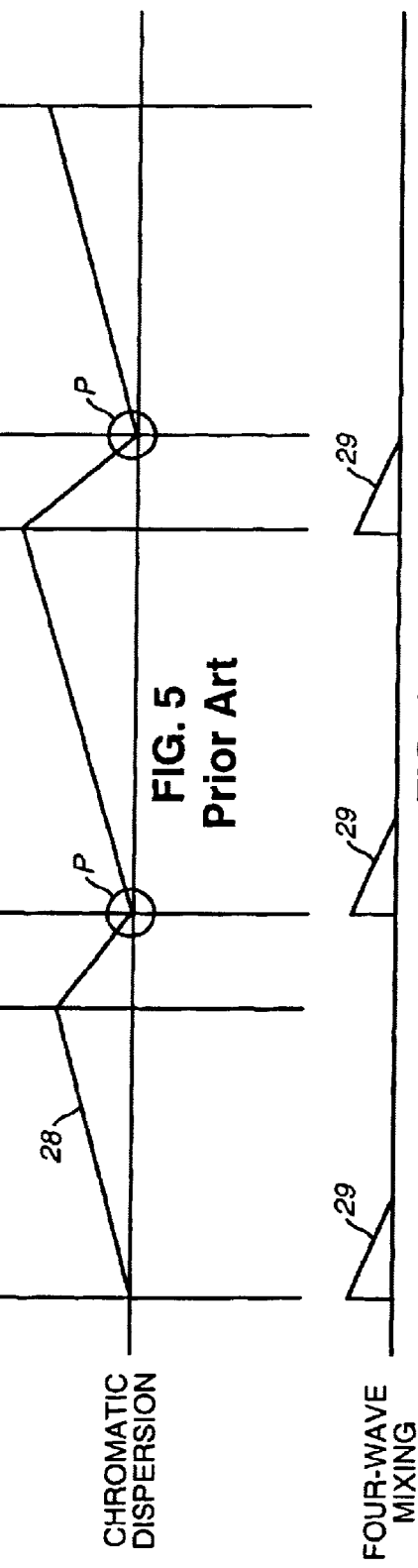

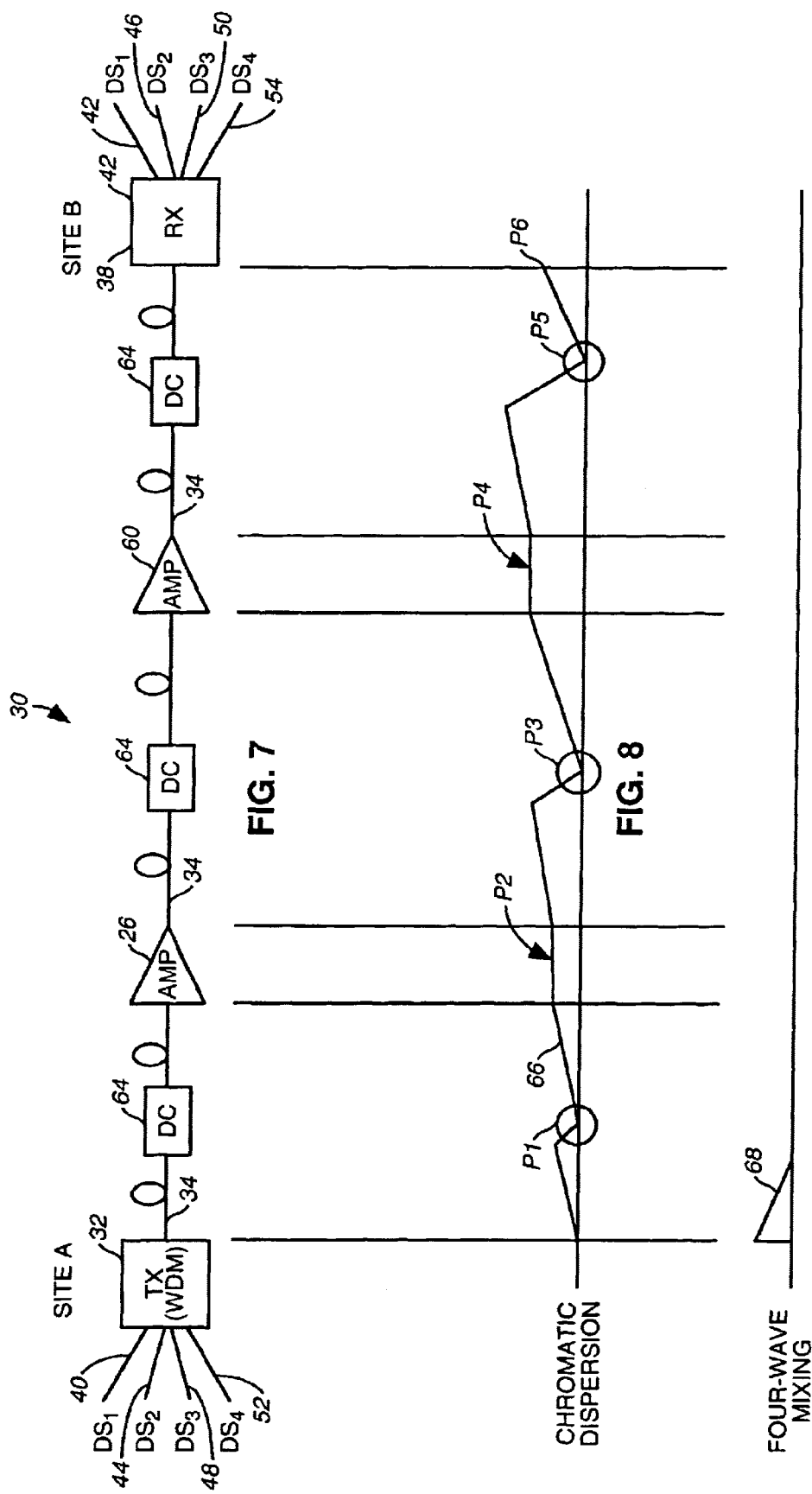

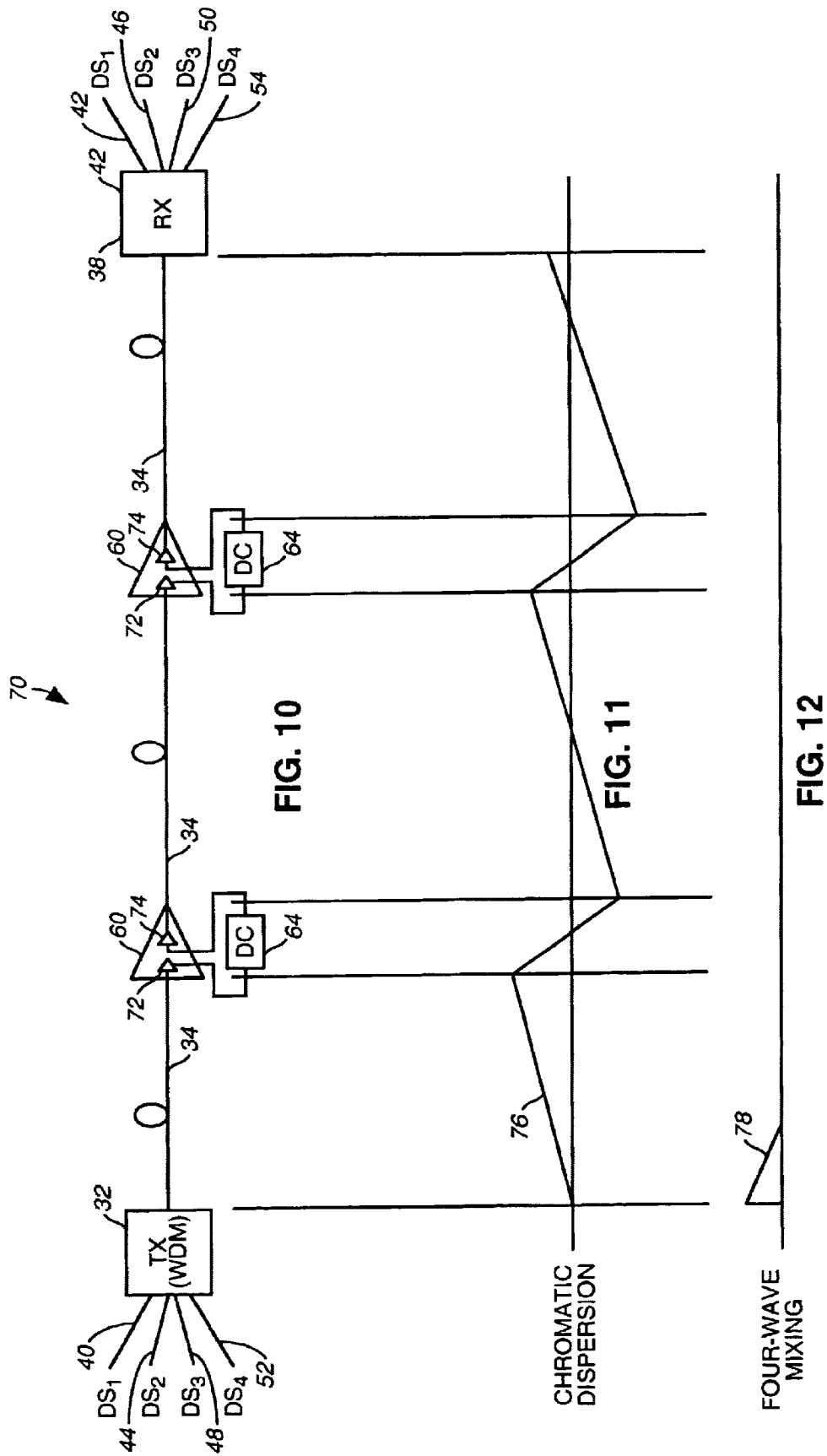

OPTICAL LINK WITH FORWARD DISPERSION
COMPENSATION AND COLLOCATED DISPERSION COMPENSATION

OPTICAL LINK WITH REDUCED FOUR-WAVE MIXING

FIELD OF THE INVENTION

The present invention generally relates to an optical communication network, and more particularly, to a system and method for reducing four-wave mixing along an extended optical fiber link.

BACKGROUND OF THE INVENTION

Optical communication networks serve to transport information at high data rates between a number of physical sites, commonly referred to as nodes. Each of these nodes are interconnected with the various other nodes by information conduits, commonly referred to as links. These links are comprised of at least one, and usually several, optical fibers. Information is usually presented to the optical communication network in the form of time-domain electrical data signals, and may represent any combination of telephony, video, or computer data in a variety of formats.

As depicted in FIG. 1, multiple data signals $D_1$, $D_2$, $D_3$ and $D_4$ are typically provided to a site for transport over an optical network 10. Typically, these data signals are coupled via a digital cross connect switch (not shown) to an optical transmitter. Each optical transmitter includes at least one, and usually several semiconductor lasers. Each semiconductor laser responsively emits light that is intensity-modulated by a corresponding input electrical data signal. This intensity-modulated light is wavelength division multiplexed (WDM) and transmitted over an optical fiber 14 to an optical receiver 16 at a remote site. That is, the transmitter converts the electrical data signals to optical signals each having a carrier frequency in the light spectrum, each input electrical data signal modulating a light carrier having a different light frequency and corresponding wavelength. Thus, as shown, for four electrical input data signals, there are transmitted four optical signals having four different wavelengths across a single optical fiber. In this manner, the data from each of these data signals is wavelength division multiplexed (WDM) over a single optical fiber.

Examples of these electrical data signals can be SONET-compliant STS-48 or STS-192 synchronous data signals each bearing digital data at about 2.5 Gbps or 9.9 Gbps, respectively. Correspondingly, the optical data signals may include SONET OC-48 or OC-192 signals bearing digital data at approximately 2.5 or 9.9 Gbps respectively. Generally, various high data rate electrical data signals are multiplexed over a single optical medium.

Frequently, optical fiber lengths between nodes are so long that several intermediate amplification stages 18 are required along the length of the fiber 14, as shown in FIG. 1. In addition to intensity loss along the fiber, the fiber medium can also introduce other impairments, such as chromatic dispersion. Chromatic dispersion causes individual light pulses to become blurred and less discernible along the optical fiber. If chromatic dispersion is not compensated in a distributed fashion, the total dispersion will accumulate along the length of the fiber as shown at 20 in FIG. 2, and the optical signal may eventually be unrecoverable at the receiving end.

One common practice for minimizing chromatic dispersion is to incorporate a dispersion compensator (DC) into each line amplifier 26 of a network 24 as shown in FIG. 4. In this approach, dispersion compensation is accomplished in a distributed fashion, as shown at 28 in FIG. 5. At each optical amplifier 26, the dispersion compensator attempts to minimize the chromatic dispersion at that point, as shown at P. The dispersion compensator nearly cancels the chromatic dispersion introduced by the optic fiber 14 up to that point. Furthermore, the dispersion compensator in a WDM system attempts to minimize the chromatic dispersion across a band of wavelengths by exhibiting a dispersion slope characteristic, as a function of wavelength, that is opposite that of the native optic fiber. Conventionally, each dispersion compensator is set to reduce chromatic dispersion to near zero at the amplifier for all wavelengths in a band.

Another potential transmission impairment observed along optical lengths is mixing among optical carriers, as shown at 22 in FIG. 3 and at 29 in FIG. 6. This mixing is caused by non-linearities in the amplification stages, and in the fiber medium at high carrier power levels. Relatively high launch powers into an optical fiber can cause the optical carriers to mix and create unwanted signal components that interfere with desired carriers. This mixing problem can be circumvented by lowering carrier power, and by steering the optical carrier wavelengths so as to move the unwanted byproducts into a harmless position in the receive spectrum. However, using lower transmit power limits the maximum distance between optical amplifiers. Steering of optical wavelengths complicates the control and selection of the optical carriers, and subverts the desire to use an evenly-spaced comb reference in a dense WDM channel plan.

There is a desire to provide an improved optical communications link that offers improved tolerance to high launch power of an optical carrier into an optical fiber to overcome attenuation through the length of the optical fiber, while minimizing the carrier interactions such as four-wave mixing that usually accompany such high launch power levels.

SUMMARY OF THE INVENTION

The present invention achieves technical advantages as an optical communication link with improved tolerance to high launch power of optical carriers and reduced carrier mixing. In accordance with the present invention, the optical communication link includes an optical fiber, at least one optical amplifier disposed along the optical fiber, and at least one dispersion compensator. In one preferred embodiment, a first dispersion compensator is located along an optical fiber between a transmitter and a first optical amplifier, with first dispersion compensator placed at some substantial distance prior to the first optical amplifier. This allows an optical carrier to be launched at a relatively high power into a fiber under dispersive conditions. A second dispersion compensator may be inserted into the fiber line at a point after the first optical amplifier where the high launch power has been eventually diminished by fiber attenuation and non-linearity of the fiber medium is no longer a problem. The second dispersion compensator brings the dispersion to a manageable value. The loss introduced by the dispersion compensator is tolerated by an ample gain budget. The optical signal then continues towards a second optical amplifier and the dispersion is again allowed to accumulate so that the optical signal is dispersively propagated during and immediately after amplification at the second optical amplifier. In this first preferred embodiment, the amplifiers and dispersion compensators are alternately spaced from one another. Four-wave mixing is reduced by advantageously using the property that chromatic dispersion in the optical fiber tends to disrupt the phase coherence that is required for mixing to occur. The present invention provides manageable chromatic dispersion at the amplifiers which tends to reduce the four-wave mixing that can occur through the amplification stage when multiple wavelengths are amplified.

According to a first method of the present invention, there is provided a method for processing an optical signal along an optical fiber link. The method comprises coupling an optical signal to the link, dispersion compensating the optical signal, allowing the optical signal to become mildly dispersed as it travels through the fiber, and then amplifying the mildly dispersed optical signal using an optical amplifier. The optical amplifier amplifies a moderately dispersed optical carrier, which advantageously reduces four-wave mixing. Consequently, a relatively high launch power of the optical carrier into the optical fiber is allowed. Another dispersion compensator compensates for the accumulated chromatic dispersion at a point past the optical amplifier, after sufficient attenuation has occurred due to fiber loss such that power level is insufficient to cause non-linearities that lead to mixing.

According to a second preferred embodiment of the present invention, there is provided an optical communication link wherein the dispersion compensator is collocated with, but prior to, a high-power output stage of an amplifier, wherein the dispersion compensator over-compensates both a slope and an absolute dispersion at the point in the fiber where the dispersion compensator is located. This assures that the high power amplification stage launches a high power carrier into the optical fiber under dispersive conditions thus avoiding four-wave mixing. According to this second preferred embodiment, the optical amplifier is provided with a pre-amplifier stage and a high power output stage, wherein the is serially coupled between the pre-amplifier stage and the output stage. The pre-amplifier stage runs at a relatively low output power since the carrier signal at this point is non-dispersive. Both the pre-amplifier and the dispersion compensator are operated at an acceptable level to avoid driving the fiber into non-linearity which would otherwise cause carrier intermodulation.

According to a second method of the present invention, there is provided a method comprising the steps of coupling an optical signal to an optical link, dispersion compensating the optical signal using a dispersion compensator, wherein the dispersion compensator is collocated with the optical amplifier, and the dispersion compensator overcompensates both a slope and an absolute dispersion of the fiber such that the amplifier launches the optical signal into a dispersive condition.

According to a third embodiment of the present invention, an optical communication link is provided with a forward dispersion compensator to overcompensate chromatic dispersion at this point and ensure that there is a neutral dispersion signal upon arrival at the next optical line element or receiver. Each subsequent amplifier is then also provided with a dispersion compensator to overcompensate both the slope and absolute dispersion of the fiber at that point to ensure that a neutral dispersion signal arrives at the next optical line element or receiver. This allows the amplification stages to launch the optical carrier into the fiber link at a high power under dispersive conditions thus avoiding four-wave mixing.

According to a third method of the present invention, the dispersion compensators render a neutral dispersion signal upon arrival at the next optical line element. The dispersion compensators are collocated with the optical amplifiers, and overcompensate both the slope and absolute dispersion of the fiber to render a dispersive condition for the amplifiers. This allows the amplification stages to launch the optical carrier at a high power into the fiber link under dispersive conditions thus avoiding four-wave mixing.

BRIEF DESCRIPTION OF THE DRAWINGS

FIG. 1 is a block diagram of a prior art optical communications link having a series of optical amplifiers and no dispersion compensation, illustrating a transmitter wave division multiplexing four optical carriers onto a single optical fiber;

FIG. 2 is a graph of the chromatic dispersion along the length of the fiber optic link shown in FIG. 1, illustrating the accumulation of dispersion along the fiber link when there is no dispersion compensation;

FIG. 3 is a graph of the four-wave mixing along the length of the fiber optic link in FIG. 1, illustrating four-wave mixing at the output of the transmitter when chromatic dispersion is essentially zero;

FIG. 4 is a block diagram of another prior art optical link arrangement including a series of amplifiers each including a collocated dispersion compensator rendering neutral dispersion at the output of the respective amplifier, wherein the transmitter wave division multiplexes four optical carriers as shown;

FIG. 5 is a graph of the chromatic dispersion along the length of the fiber optic link of FIG. 4, illustrating the chromatic dispersion being returned to zero at the output of the respective amplifiers;

FIG. 6 is a graph of the four-wave mixing along the length of the fiber optic link of FIG. 4, illustrating four-wave mixing at the output of the transmitter and the amplifiers when chromatic dispersion is zero;

FIG. 7 is a block diagram of a first embodiment of the present invention wherein amplifier stages and dispersion compensation stages are alternately placed at intervals along the optical fiber, whereby the chromatic dispersion is returned to zero at a point short of the next amplifier to provide some chromatic dispersion at the subsequent amplifier and thus reduce four-wave mixing at the output of the amplifier;

FIG. 8 is a graph of the chromatic dispersion along the optical fiber link of FIG. 7, illustrating the chromatic dispersion being returned to zero at the dispersion compensator to provide some chromatic dispersion at the amplifier;

FIG. 9 is a graph of the four-wave mixing along the optical link of FIG. 7 illustrating four-wave mixing only at the output of the transmitter;

FIG. 10 is a block diagram of a second embodiment of the present invention having a dispersion compensator collocated with each amplifier stage, wherein the dispersion compensator overcompensates both the slope and absolute dispersion of the optical fiber up to that point to ensure the high-power amplification stage launches a high power optical carrier into dispersive conditions to avoid four-wave mixing;

FIG. 11 is a graph of the chromatic dispersion of the optical link of FIG. 10 wherein the dispersion compensator renders a dispersive environment for the output stage of the amplifier;

FIG. 12 is a graph of the four-wave mixing of the optical link of FIG. 10 wherein four-wave mixing is only generated at the output of the transmitter;

DESCRIPTION OF THE PREFERRED EMBODIMENT

Figure 13:
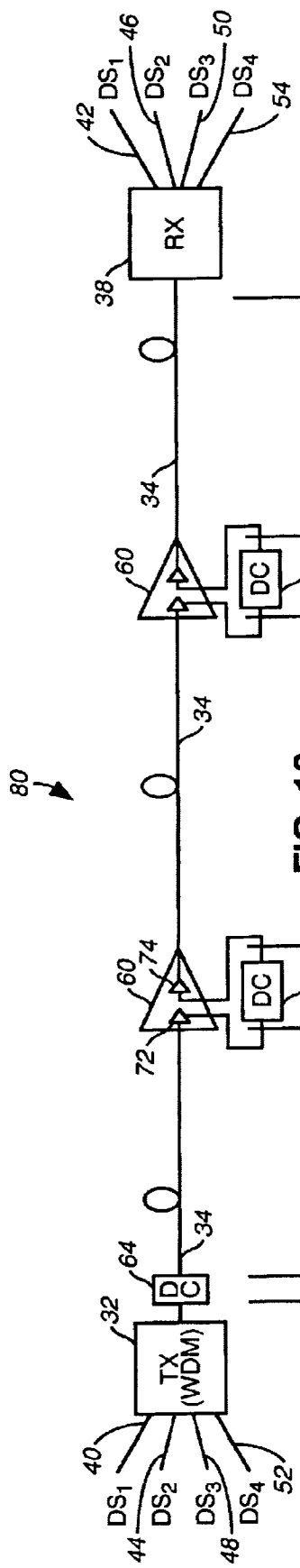
FIG. 13 is block diagram of a third embodiment of the present invention where a forward dispersion compensator is provided at the output of the transmitter to overcompensate both the slope and absolute dispersion of the fiber at the output of the transmitter and render a neutral dispersion signal at the first amplifier, wherein a dispersion compensator is collocated with each of the amplifiers to overcompensate both the slope and the absolute dispersion of the fiber up to that point and render a dispersive environment at the output stage of the amplifier.

Referring now to FIG. 7, there is generally shown at 30 an optical link with alternately spaced amplifiers and dispersion compensators according to one preferred embodiment of the present invention. Optical link 30 is seen to include an optical transmitter at site A receiving four high data rate electrical data signals $D_1$, $D_2$, $D_3$, $D_4$. For purposes of illustration and clarity to teach the present invention, four electronic data sources and four corresponding optical carriers are illustrated and discussed herein with it being understood more or fewer data sources and carriers could be implemented as desired, and limitation to the number of sources and optical carriers is not to be inferred. Transmitter 32 typically includes a separate semiconductor laser for each of the corresponding input data signals, and thus as illustrated in the present embodiment, contains four separate semiconductor lasers. Multiple lower data rate signals, such as DS3 signals, are usually first time division multiplexed to form one high data rate input data signal, which data signal modulates a single semiconductor laser. Light emitted by each semiconductor laser is intensity-modulated by the respective electrical data signal coupled to the transmitter 32 to deliver a modulated optical output signal or carrier over optical fiber 34. Each semiconductor laser emits a light carrier at a different frequency from one another, and thus, transmitter 32 provides wavelength division multiplexing (WDM) such that all four modulated optical carriers travel over a single optical fiber 34.

An optical receiver 38 is located at site B and includes a respective photodiode tuned to the frequency of the optical carrier generated by the respective semiconductor laser at transmitter 32. The photodiodes at receiver 38 transduce the optical signals to render faithful electrical reproductions of the respective data signals $D_1$, $D_2$, $D_3$, and $D_4$. Data provided as $D_1$ to the transmitter 32 is faithfully transmitted over the optical fiber and reproduced at the corresponding output line $D_1$ at site B. Likewise, data provided as $D_2$, $D_3$ and $D_4$ to transmitter 32 is likewise transmitted over the optical fiber 34 and faithfully reproduced at the respective output at site B. As shown in FIG. 7, input line 40 is optically coupled to output line 42, input line 44 is optically coupled to output line 46, input line 48 is optically coupled to output line 50 and input line 52 is optically coupled to output line 54.

As illustrated in FIG. 7, at least one, and preferably a plurality, of optical amplifiers 60 are provided along the length of optical fiber 34. At least one, and preferably several, dispersion compensators (DC) 64 are provided in series with the optical fiber 34 at points spaced from each of the amplifiers 60 such that the dispersion compensators 64 and amplifiers 60 are alternately spaced from one another. A first dispersion compensator 64 is provided between the transmitter 32 and the first amplifier 60 such that the chromatic dispersion is returned to zero at a point $P_1$ prior to the first amplifier 60, as shown at 66 in FIG. 8. After the first dispersion compensator 64, the chromatic dispersion slowly accumulates along the length of the fiber 34 due to the dispersive characteristics of the native fiber. As shown in FIG. 8, the optical signal is dispersively propagated during and immediately after amplification at amplifier 60 as shown at $P_2$. The optical amplifiers 60 each amplify the four optical carriers and launch them back into the fiber 32 at a relatively high power into dispersive conditions without generating four-wave mixing, as illustrated at 68 in FIG. 9.

The present invention takes advantage of the fact that the high-power optical signals immediately out of the amplification stages 60 experiences a dispersive environment. Thus, the present invention reduces four-wave mixing by advantageously using the property that dispersion in the fiber tends to disrupt the phase coherence that is required for four-wave mixing to occur. By not returning chromatic dispersion to zero at the output of the amplifiers, the amplifiers can be driven at a higher power level without generating four-wave mixing.

Referring again to FIG. 7, it can be seen that the second dispersion compensator 64 is provided at a point inbetween the first amplifier 60 and the second amplifier 60, and is spaced therebetween to return the chromatic dispersion to zero at point $P_3$, as shown in FIG. 8. The dispersion compensator 64 is provided at a point sufficiently past the previous amplifier 60 to take advantage of the attenuation of the optical fiber 34, specifically, at a point where the optical power has attenuated from the previous amplifier 60 to an acceptable level, meaning that the optical power levels have diminished enough so the fiber medium exhibits a linear index of refraction. The loss introduced by the dispersion compensators 64 can be tolerated by an ample gain budget, especially considering that the amplification stages are allowed to operate at higher gain or power levels. As the optical signals continue toward the next amplification stage 60, the dispersion is again allowed to accumulate so that the optical signals are dispersively propagated during and immediately after amplification as shown at $P_4$.

As shown at $P_4$ in FIG. 8, the accumulated chromatic dispersion at the second amplifier 60 is sufficient to allow the second amplifier 60 to launch the optical carriers into the next segment of the fiber 34 at a high optical power density without generating four-wave mixing. The chromatic dispersion continues to accumulate after the second amplifier 60, and is then returned to zero, or nearly zero, at $P_5$ by the third dispersion compensator 64 positioned between the second amplifier 60 and the receiver 38. The chromatic dispersion $P_6$ at the receiver 38 is sufficiently low to allow the receiver photodiodes to receive the respective optical carriers and render a faithful electrical reproduction of data signals $D_1$, $D_2$, $D_3$ and $D_4$ at the respective output ports 42, 46, 50 and 54.

The present invention achieves technical advantages in that four-wave mixing is substantially reduced or eliminated. In addition, chromatic dispersion is controlled such that the optical amplifiers can be run at a higher output level to launch the optical light carriers into the next segment of the fiber without inducing four-wave mixing. The present invention also takes advantage of the attenuation of the optical fiber. Each dispersion compensators is sufficiently spaced from the previous amplifier to tolerate the power level at the respective point in the optical fiber. Moreover, the dispersion compensator's loss can be tolerated due to the increased gain budget provided by the amplifier 60 being run at a higher power level. Due to the high launch powers, for a given length of fiber 34, a reduced number of amplifiers 60 and dispersion compensators 64 are required.

Referring now to FIG. 10, there is shown an optical link according to a second preferred embodiment of the present invention being generally shown at 70. Optical link 70 is similar to optical link 30 wherein like numerals refer to like elements. However, the dispersion compensators 64 are collocated with the amplifiers 60. Specifically, the dispersion compensators 64 are located in series between a preamplifier stage 72 and a high power output amplification stage 74 of the respective amplifier 60.

As shown at 76 in FIG. 11, the dispersion compensator at each amplifier 60 overcompensates both the slope and absolute dispersion of the fiber 34 up to that point, prior to the high power output amplification stage 74. This assures that each high power amplification stage 74 launches high power optical carriers under dispersive conditions, thus reducing four-wave mixing as shown by the graph 78 in FIG. 12. Each pre-amplifier stage 72 is operated at a rather low power level since the optical signals are non-dispersive at this point. Both the pre-amp 72 and the output amplification stage 74 are safely driven to avoid non-linearity that would cause carrier intermodulation.

The embodiment shown at 70 in FIG. 10 achieves technical advantages since each output stage 74 of the respective amplifier 60 can be run at a high power level to launch the respective optical carriers into the next segment of fiber 34, thus increasing the permitted spacing between amplifiers 60. Thus, for a given length of fiber 34 between site A and site B, fewer amplifiers 60 are required. This lowers the overall complexity and cost of the fiber link 70. Moreover, four-wave mixing is reduced since the output stages 74 of the respective amplifiers 60 launch a high power optical signal into a dispersive environment. Again, the present invention takes advantage of the dispersive environment at the output of the output stages 74, which dispersion in the fiber tends to disrupt the phase coherence that is required for four-wave mixing to occur.

Figure 14:
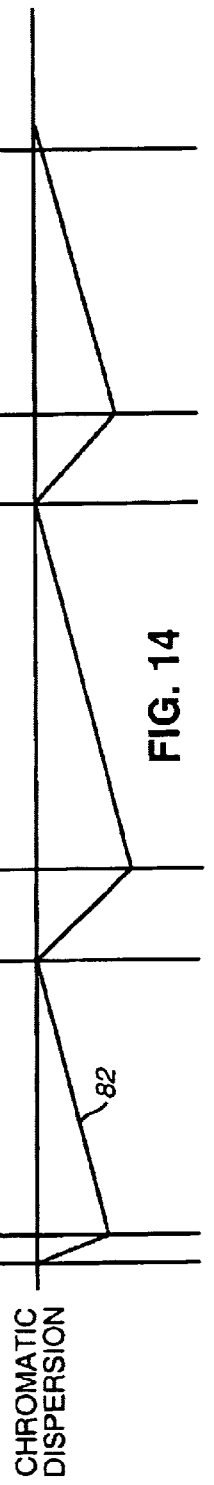
FIG. 14 is a graph of the chromatic dispersion along the length of the optical fiber of FIG. 13.
Figure 15:
FIG. 15 is a graph of the four-wave mixing of the optical link of FIG. 13 illustrating only a small amount of four-wave mixing at the forward dispersion compensator.

Referring now to FIG. 13, there is shown at 80 an optical link according to a third preferred embodiment of the present invention. Optical link 80 is similar to optical link 70 of FIG. 10, wherein like numerals refer to like elements. However, in this embodiment an additional dispersion compensator 64 is provided at the output of the transmitter 32 to overcompensate both the slope and absolute dispersion of the fiber at the output of the transmitter 32. The fiber run after this first dispersion compensator 64 adds a preemptive, predetermined dispersion to render a neutral dispersion signal upon arrival at the first amplifier 60, as shown at 82 in FIG. 14. Similar to the optical link 70 in FIG. 10, the optical link 80 compensates the optical signals before they are dispersed by a given length of fiber. The subsequent dispersion compensators 64 are provided in series between the preamplifier stage 72 and the output amplifier stage 74 to overcompensate both the slope and the absolute dispersion of the fiber up to that point. Pre-amp 72 and compensator 64 are safely driven to avoid non-linearity that could cause carrier intermodulation. Pre-amp stage 72 is operated at a rather low output power since the output optical signal is non-dispersive at this point. However, output stage 74 is operated at a high output power to launch the optical carriers into the fiber at a sufficiently high power since the output of the amplifier is a dispersive environment. The dispersive environment at the output of each amplifier 60 disrupts the phase coherence that is required for four-wave mixing to occur. The overcompensation of the dispersion compensator 64 provides the dispersive environment at the output of the amplifier 60 allowing the output stage 74 to be driven at a high power.

Since the output amplifier 74 is run at a high power, the distance between amplifiers 60 is extended, thus reducing the number of amplifiers 60 required for a given length of fiber 34 between site A and site B as compared to prior art conventional designs. Each dispersion compensator 64 overcompensates both the slope and absolute dispersion of the fiber up to that point such that the fiber length after the respective amplifier and dispersion compensator adds enough dispersion to render a neutral dispersion signal upon arrival at the next optical line element or receiver. Again, this embodiment includes compensating the optical signals before they are dispersed by a given length of fiber.

All three embodiments of the present invention, namely, the optical links 30, 70 and 80 allow the optical amplifiers to be operated at increased power levels to launch relatively high optical power signals into the fiber without causing four-wave mixing, or create other unwanted signal components that interfere with the optical carriers. All three embodiments allow the use of an evenly-spaced comb reference in a dense WDM channel plan, which is desirable. The optical carriers are always recoverable by a subsequent dispersion compensator since the accumulated chromatic dispersion is never sufficient to prevent recovering a signal. Wherein chromatic dispersion is generally considered to be an impediment to optical communication systems, the present invention takes advantage of the dispersive condition to run the optical amplifiers at a higher output level by optimally choosing the placement of the dispersion compensators. A reduced number of amplifiers, and thus a reduced number of dispersion compensators are required for a given length of optical fiber between sites. Four-wave mixing is reduced or eliminated since the amplifiers are always amplifying into a dispersive environment.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An optical communication link for communicating a plurality of optical carrier signals comprising:
   an optical fiber link comprising at least one optically transmissive medium through which the optical carrier signals propagate;
   at least one optical amplification means disposed along said optical fiber link and amplifying at least one of the optical carrier signals; and
   at least one dispersion-modifying element disposed along said fiber link, the dispersion-modifying element being positioned along the optical link a sufficient distance past the optical amplification means that the optical carrier signals are diminished in power to experience a substantially linear refractive index in propagating through the optically transmissive medium.

2. The optical communication link of claim 1 wherein the optical amplification means imparts sufficient optical power to cause the optically transmissive material to exhibit refractive index non-linearity.

3. The optical communication link of claim 2 wherein the optical amplification means imparts sufficient optical power to cause the generation of mixing products of the optical carrier signals.

4. The optical communication link of claim 2 wherein the dispersion-modifying element is positioned where the power of the optical carrier signals is attenuated by passage through the optically transmissive medium to an extent that the incidence of mixing among the optical carrier signals is acceptably low.

5. The optical communication link of claim 1 wherein the dispersion-modifying element substantially reduces the magnitude of a group velocity dispersion characteristic for at least one of the optical carrier signals.

6. The optical communication link of claim 5 wherein the at least one optical carrier signal experiences a significant group velocity dispersion effect after being amplified by the optical amplification means.

7. The optical communication link of claim 1 wherein at least one of the optical carrier signals experiences a significant group velocity dispersion effect before reaching the dispersion-modifying element.

8. The optical communication link of claim 7 wherein the at least one optical carrier signal experiences a significant group velocity dispersion effect prior to being amplified by the optical amplification means.

9. The optical communication link of claim 8 wherein the group velocity dispersion effect is caused at least partially by at least one of a dispersion characteristic of the optically transmissive medium, a dispersion-modifying means disposed along the link, and a dispersion-modifying means substantially collocated with the optical amplification means.

10. The optical communication link of claim 9 wherein the group velocity dispersion effect is caused at least partially by at least one of a dispersion characteristic of the optically transmissive medium, a dispersion-modifying means disposed along the link, and a dispersion-modifying means substantially collocated with the optical amplification means.

11. The optical communication link of claim 1, wherein the dispersion-modifying element is distinct from the optical fiber link.

12. A method of processing a plurality of optical carrier signals passing through an optically transmissive medium comprising the steps of:

at a first position along the medium, coupling into the medium at least one optical carrier signal at sufficient power to cause the medium to exhibit refractive index non-linearity;

at at least one second position along the medium, applying a dispersion-modifying element to affect a dispersion characteristic experienced by at least one optical carrier signal, whereby the second position is sufficiently distant from the first position that the optical carrier signal has diminished in power to experience a substantially linear refractive index through the medium.

13. The method of claim 12 whereby the dispersion-modifying element reduces the magnitude of the dispersion characteristic substantially to zero.

14. The method of claim 12 further comprising the step of ensuring that, at some point prior to reaching the second position, the optical carrier signal has been subject to a substantially non-zero dispersion characteristic.

15. The method of claim 12, wherein the dispersion-modifying element is distinct from the transmissive medium.

16. In an optical communications link carrying a plurality of optical carrier signals, a method of determining the placement of a dispersion-modifying element comprising the steps of:

determining a threshold power level above which the link exhibits unacceptable incidence of four-wave mixing among the optical carrier signals;

determining a first position along the link at which the power level of the optical carrier signals exceed the threshold power level;

determining a second position along the link, distant from the first point, at which the optical carrier signals are attenuated below the threshold power level;

placing the dispersion-modifying element along the link at least as far away from the first position as the second position.

17. A method of passing optical carrier signals through an optical fiber, the optical fiber comprising at least one optically transmissive medium through which the optical carrier signals propagate, the method comprising:

disposing an optical amplifier along the optical fiber, the optical amplifier configured to amplify at least one of the optical carrier signals; and positioning a dispersion-modifying unit at a distinct location along the optical fiber, the location being a sufficient distance past the optical amplifier such that the optical carrier signals are diminished in power so as to experience a substantially linear refractive index in propagating through the optically transmissive medium.

* * * * *